Dec. 24, 1929.  J. E. TUSCHER  1,741,084
ROTARY ENGINE
Filed Dec. 13, 1926  6 Sheets-Sheet 1

Inventor
Jean Edouard Tuscher
By James L. Norris
Attorney.

Dec. 24, 1929. J. E. TUSCHER 1,741,084
ROTARY ENGINE
Filed Dec. 13, 1926 6 Sheets-Sheet 4

Inventor
Jean Edouard Tuscher
By
James L. Norris
Attorney

Dec. 24, 1929.  J. E. TUSCHER  1,741,084
ROTARY ENGINE
Filed Dec. 13, 1926   6 Sheets-Sheet 6

Fig.9.

Patented Dec. 24, 1929

1,741,084

UNITED STATES PATENT OFFICE

JEAN EDOUARD TUSCHER, OF PARIS, FRANCE

ROTARY ENGINE

Application filed December 13, 1926, Serial No. 154,610, and in France December 17, 1925.

The present invention relates to an internal combustion engine comprising an internal drum centered and keyed upon the driving shaft, and a stator, disposed eccentrically with respect to said inner drum, while in the bore thereof there is mounted an outer drum of a diameter equal to that of said bore, the said outer drum, which is tangential to the interior of the inner drum, having radial internal vanes engaging corresponding pivots in the inner drum, which is therefore rotated by the outer drum referred to above.

In view of the fact that the movement of the outer drum takes place around the axis of the stator, while the movement of the inner drum takes place around the axis of the engine shaft, the various chambers formed between the radial vanes and the inner and outer drums or cylinders will vary in volume from zero up to a maximum. The air and fuel admitted into these chambers for the purpose of being burnt therein in accordance with any desired cycle, produce gases, the expansion of which acts upon the said vanes to create the desired motive couple upon the driving shaft of the inner drum.

According to one form of construction of the invention, two lateral cheeks are fixed to the outer drum carrying the vanes, which are themselves fixed to said cheeks, the unit formed by the said drum and the said cheeks being rotatable on ball bearings in brackets which are eccentric relative to the driving shaft which carries the inner drum.

According to one characteristic feature of the invention, and in order to enable the rotary movement of the inner and outer drum around two different axes to take place, the vanes fixed to the outer drum are mounted in the inner drum (relative to which they have radial play) by means of pivotal joints, the axes of which are parallel to the axes of rotation.

These pivotal joints are each constituted by a double jaw, in the form of a ball and socket joint, the two halves of which embrace the corresponding wall under the action of springs located in recesses of said halves; each jaw is itself fitted in a cylindrical sleeve, movable in a corresponding recess of the inner drum.

A tight joint is thus provided for each chamber by the inner jaws alone, the pressure which these latter exert upon the radial vanes being suitably adjusted, while the sleeves are subjected to the pressure of the gases in the compression or combustion chambers, thereby releasing the jaws from said pressures.

With this arrangement the friction due to the movement of the outer drum relative to the inner drum is minimized; furthermore, it is easy to obtain a fluid-tight joint between these various points, and consequently to obtain a high degree of efficiency.

According to another characteristic feature of the invention, the distribution is controlled by the outer drum itself, which for this purpose is provided with ports cooperating with fixed ports of the stator.

According to a particular form of construction, the outer drum comprises, for each chamber, an admission port situated at the front end (relative to the direction of rotation of this chamber), and an exhaust port situated at the rear extremity. These ports come into communication at each revolution with the fixed ports of the stator, so as to admit fuel and air, or for the exhaust, the said fixed and movable ports being arranged in different planes so that during rotation, the movable ports only come into communication with the corresponding fixed ports.

According to one characteristic feature of the invention, the successive admissions of compressed air and then of fuel, are effected in each chamber after the front vane of this chamber has passed the tangent point of the two drums, the fixed ports for the inlet of air and fuel being then arranged upon the stator after this tangent point.

According to the invention, the fixed port for the fuel is formed in the stator in such a manner that the movable admission ports passing under the said port actuate one or more pumps for injecting fuel placed in the immediate neighbourhood of the outer drum, through the intermediary of negative cams.

Other characteristics of the invention will be evident from the following description, taking into account at the same time the accompanying drawings which show diagrammatically and merely by way of example a form of execution of the invention.

In the drawings:

Figs. 3, 4, 5 and 6 are diagrammatic views showing the engine according to the present invention in the different positions which it occupies successively, Fig. 3 being a section on line 3—3 of Fig. 2ª, Figs. 4 and 6 both being sections on line 2—2 of Fig. 2ª, while Fig. 5 is a section, from a—b, in a clockwise direction, on line 2—2 of Fig. 2ª, and from b to a is a section on line 3—3 of Fig. 2ª.

An inner drum 2 is keyed and centered upon the engine shaft 1 and this drum rotates in such a manner as to be constantly tangent at a certain point, to the inner bore of an outer drum 3 of greater diameter than the inner drum 2 and which is mounted eccentrically relative to this latter. The outer drum 3, of which the outer and inner cylindrical surfaces are concentric, rotates freely in the bore of a stator 4 which can be constructed in any suitable manner, for example, in two parts supported on a frame 5. This stator is mounted eccentrically relative to the engine shaft 1 and receives concentrically with itself the outer drum 3 which is also eccentrically mounted relative to the shaft 1. This latter is supported in bearings 25ª carried by the frame 5.

The inner drum 2 has an inner chamber 6 in which the cooling water circulates, this water entering and leaving through the inner grooves 7 and 8 of the shaft 1 and the radial channels 9 and 10 of this shaft and of the inner drum 2.

Inner radial vanes 13, 13ª, and 13ᵇ are sunk in the outer drum 3 and are fixed laterally by means of screws 14 upon heads or cheeks 11 and 12 fixed to the ends of the outer drum 3. Each of the vanes 13, 13ª and 13ᵇ is fitted in a radial pivotal joint or oscillatory two-part sleeve 15 arranged in and carried by the inner drum 2. The rotation of the outer drum 3, the actuation of which will be described below, therefore causes the rotation of the inner drum 2 and consequently that of the shaft 1. In view of the fact that the rotary movement of the outer drum 3 must necessarily take place owing to the fact that the outer diameter of the rim of the outer drum 3 is equal to the bore of the stator, about the geometrical axis of this bore, whereas the rotation of the inner drum 2 can only take place around the axis of the shaft 1, and as these two axes are distinct, it is necessary to mount the vanes as 13 upon the inner drum 2, so that they may be able to move tangentially relative to the inner drum 2, while at the same time effecting a radial movement relative to said inner drum 2.

Figure 1:
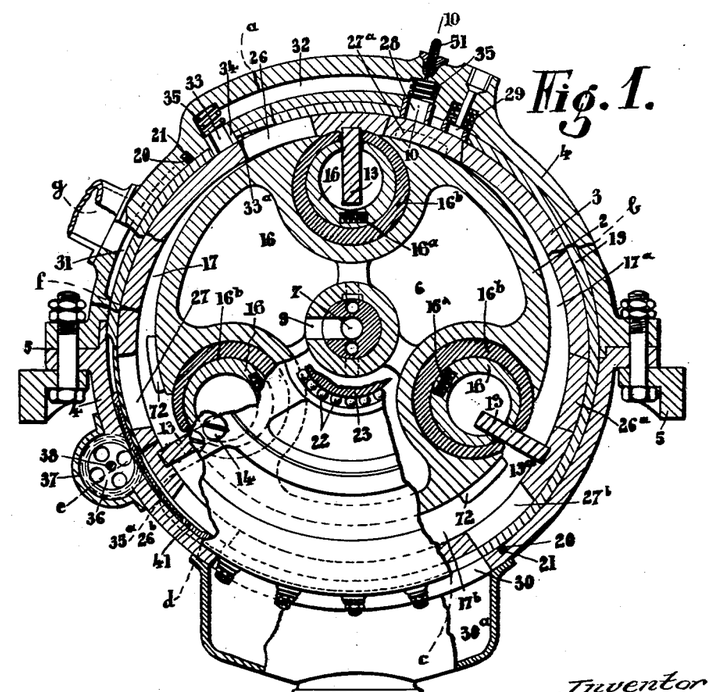
Fig. 1 is a view of the engine in cross-section on different planes of Fig. 2ª, that is, in a clockwise direction, the portions a—b, d—e, f—g, being sections on the line I—I, Fig. 2ª, through the inlet ports of the working chambers, the portions b—c, e—f, g—a being sections on the line II—II of Fig. 2ª through the exhaust ports of the working chambers, and c—d being in outside elevation.

In the example shown in Fig. 1, each of the vanes as 13 is held between two substantially semi-cylindrical jaws 16 which can rotate in corresponding recesses 16ᵍ formed in the body of the inner drum 2, while the said wall can also move radially between the two jaws. In order to ensure a fluid-tight fit, compression springs 16ª are fitted in recesses formed in the inner portion of the jaws.

Figure 7:
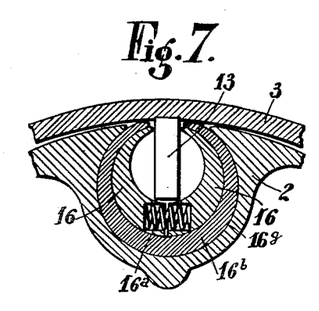
Fig. 7 is a large scale section of a pivotal joint in the position in which the two drums are tangential
Figure 8:
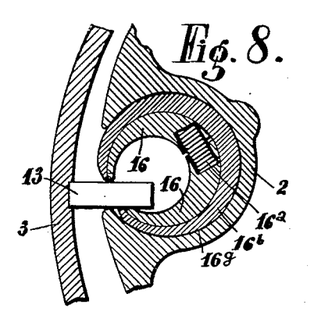
Fig. 8 is a view corresponding to Fig. 7 but in a position at 90 degrees with respect thereto.

In Figs. 7 and 8 is shown, in detail, and to a large scale, and in the two extreme positions, one of the pivotal joints moving within the sleeves 16ᵇ arranged in corresponding recesses 16ᵍ of the inner drum 2.

Figure 9:
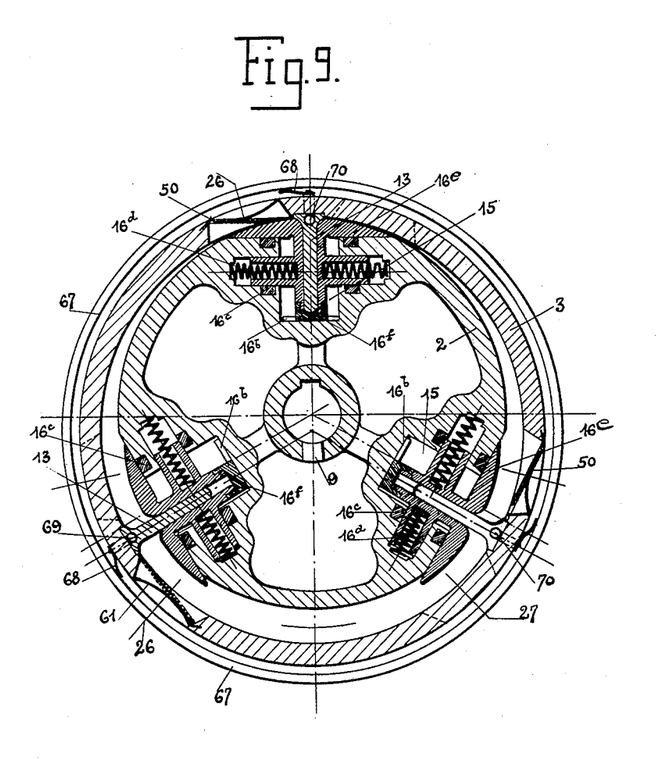
Fig. 9 is a cross section of the drums in the plane of the inlet ports but illustrating another form of construction of the method of coupling together the two drums according to the invention.

In the form of construction shown in Fig. 9, each of the vanes 13 is fitted between two supports 16ᵉ which are connected together by plates 16ᶠ which are held at the bottom of the grooves 15 of the drum 2 in slideways 16ᵇ. The support 16ᵉ can slide tangentially on either side of the radial axis of the vanes 13 to an extent equal to that of the eccentricity of the drums 2 and 3. Rectilinear packing pieces 16ᶜ fitted in suitable recesses in the drum 2 are urged by centrifugal force against the tangential slideways of the supports 16ᵉ and maintain the pivotal joint fluid tight. Pressure springs 16ᵈ hold the said supports 16 in contact with the vanes 13 which must have free radial play relative to them. The upper faces of the supports 16 are turned to fit the external diameter of the drum 2.

Figure 2:
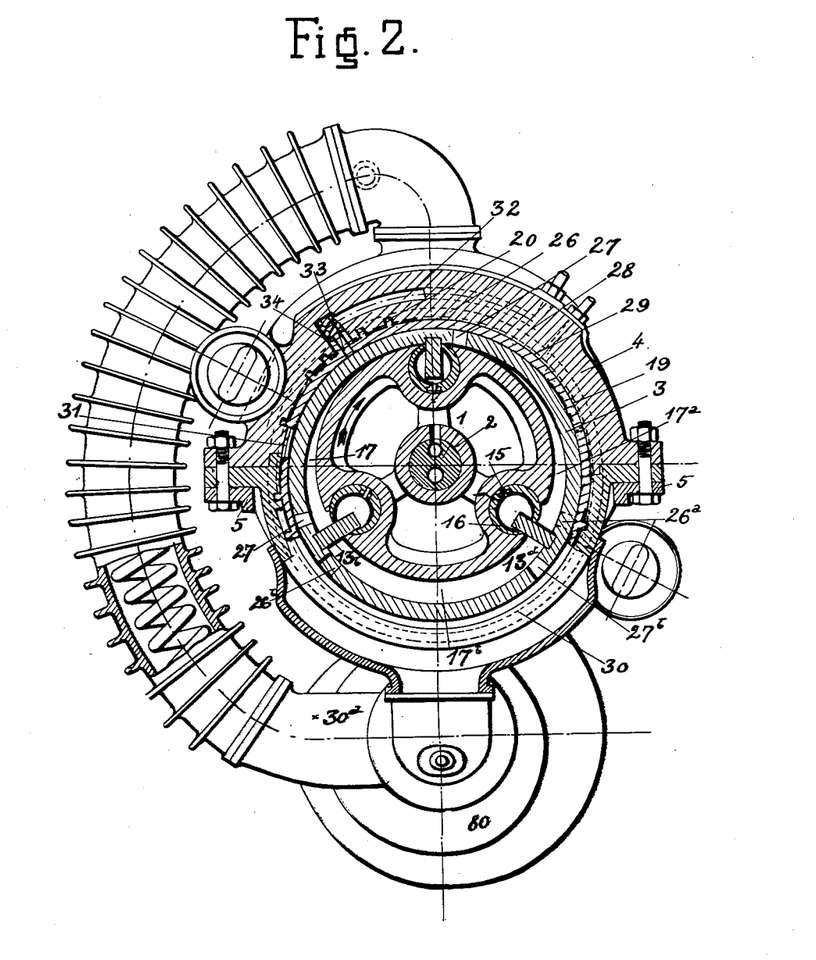
Figs. 2 and 2ª are enlarged views of a form of construction of the invention, Figure 2 being a cross-section on line 2—2 of Figure 2ª, while Figure 2ª is a longitudinal elevation partly in section thereof.
Figure 2A:
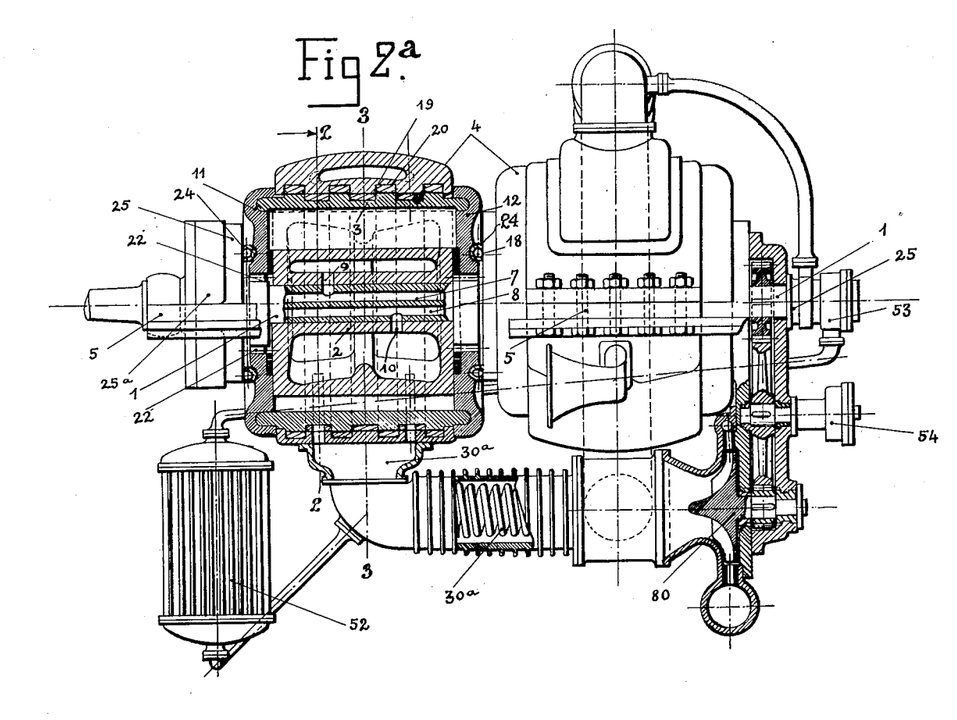

The vanes 13, 13ª, 13ᵇ form three hermetically closed chambers 17, 17ª, 17ᵇ between the drums 3 and 2. The hermetic joint between the lateral faces of the inner drum 2 and the heads 11 and 12 of the outer drum 3 is obtained by the intermediary of a plurality of packing rings 18 (Fig. 2ª). The hermetic joint between the outer drum 3 and the stator 4 is also obtained through the intermediary of packing rings 19 and of labyrinths arranged opposite the ports of the said outer drum 3 (Figs. 2 and 2ª) and by means of packing bars 20 (Figs. 1, 2 and 2ª) arranged between these segments and acted upon by springs 21, (Fig. 1). The relative eccentric rotary motion of the outer and inner drums 3 and 2 causes the volume of the chambers 17, 17ª, 17ᵇ to vary. Each of these chambers is divided, when its corresponding vane reaches a position opposite the tangent point, into two chambers $17_1, 17_2$, (Fig. 3), one of which increases from zero to a maximum and the other decreasing from said maximum to zero. As will be seen below it is this particular phenomenon which is utilized with a view to obtaining the driving couple from the shaft 1.

The outer drum 3 rotates upon roller bearings 22 mounted on extensions 25ª of the bearings 25, said bearings being eccentric relative to the shaft 1. The bearings 25 are fixed upon the frame 5. Thrust bearings 24 are also mounted between each of the cheeks 11 and 12 and the bearings 25.

The compression of the air, the admission of this air and of the fuel into the chambers 17, the ignition of this combustible mixture, the expansion of the gases producing the motive couple, the exhaust of these gases, and finally, the scavenging of these gases, are obtained automatically in the following manner.

The outer drum 3 has two ports 26, 27ª, 26ª, 27ᵇ, 26ᵇ and 27 on each side of each of the vanes 13, 13ª, and 13ᵇ, the ports 26, 26ª, 26ᵇ being utilized for the admission of compressed air and of fuel into the chambers 17, 17ª, 17ᵇ while the ports 27 27ª, 27ᵇ serve for the exhaust from the said chambers. The admission port 26 and the exhaust port 27 are located in different planes. It is furthermore evident that each of these ports could be divided up into two or more.

Fixed ports 28 for the admission of compressed air and fixed ports 29 for the admission of fuel are formed in the body of the stator 4 in the same plane as the inlet ports 26. These ports are arranged after the tangent point of the drums 2 and 3 in the direction of rotation of the engine so that the admission takes place in each chamber 17, which is bounded forwardly by a radial vane and rearwardly by the generatrix of the tangent of the drums.

In the same way, a port 30 is formed in the stator 4 in the plane of the exhaust ports 27 and an exhaust port 30ª communicates with this port 30, this latter extending over about a third of the circumference.

In the case shown in the drawing the engine sweeps out the exhaust gases and compresses the air necessary for its operation. With this end in view, the stator 4 is provided with a port 31 communicating with the atmosphere and which is situated in the same plane as the inlet ports 26. Furthermore, a chamber 32 is formed in the stator 4 which constitutes a reserve chamber for air and which is characterized by two ports, one port 33 for the inlet of the compressed air, situated forward of the tangent point and in the plane of the exhaust ports 27, and a port for the exit of the air from this chamber which is the same as the air inlet port 28 mentioned above and which is in the plane of the inlet ports 26. A compression-relieving groove 33ª is provided opposite the port 33.

In order to obtain a hermetic joint between the fixed ports 28, 29 and 33 and the outer drum 3, a cylinder 34 is fitted in each of these ports and a spring 35 presses it constantly against the outer drum 3. These cylinders 34 rest upon the outer drum 3 through corresponding openings in the packing members 19.

With a view to describing the method of operation of the engine let us assume that it is running under normal conditions, compressed air being contained in the reserve chamber 32 and referring to Figs. 1 and 3 to 6 of the drawing, we will only consider the case of the one chamber 17 since the same phenomena take place in each of the other chambers.

Figure 3:
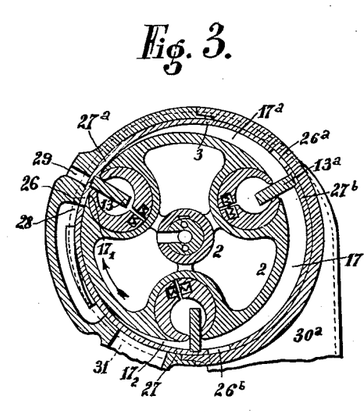

In the position shown in Fig. 1 the radial wall 13 is exactly opposite the tangent point of the drums 2 and 3. As soon as it has passed this tangent point the corresponding chamber 17 is divided as indicated above into two chambers $17_1, 17_2$ (Fig. 3). The inlet port 26 reaches a position opposite the fixed port 28 and compressed air coming from the reserve chamber 32 is admitted into the chamber $17_1$. Immediately afterwards the port 26 comes into position opposite the port 29 and the fuel under pressure flows into this chamber $17_1$. Under the influence of the high pressures and temperatures existing in this chamber, self-ignition of the combustible mixture takes place. The gases resulting from this combustion expand and exert a high pressure upon the vane 13, thereby exerting a tangential force upon the inner drum 2 and creating a rotary driving couple upon the shaft 1. As the chamber $17_1$ is bounded rearwardly by the outer drum 3 and the inner drum 2 which are tangent to each other, no driving couple in the opposite direction can be produced.

Figure 4:
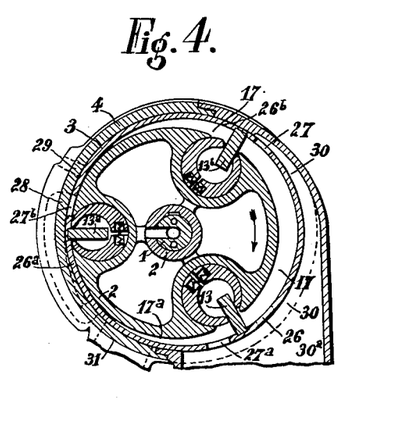

The movement of rotation of the vane 13 brings it into the position shown in Fig. 4. During this movement the chamber $17_1$ increases continually in volume and finally when the vane 13ᵇ reaches the tangent point, becomes the chamber 17 and the gases have expanded.

Figure 5:
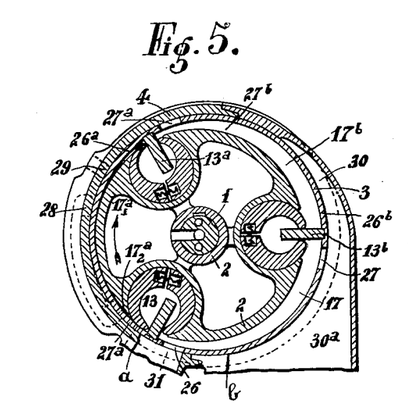

As can be seen in this Fig. 4, the exhaust port 27 of this chamber 17 then reaches a position opposite the port 30 and the burnt gases escape through the exhaust port 30ª at a pressure which is lower than atmospheric. This exhaust takes place along the entire length of this port 30. Before the termination of the exhaust the admission port 26 of the chamber 17 under consideration reaches a position opposite the port 31, which is in communication with the atmosphere, (Fig. 5).

Air at atmospheric pressure enters the chamber 17 and drives into the exhaust any burnt gases which may have remained in the chamber 17, the volume of which is decreasing. A vacuum is maintained in the exhaust port 30ª by an exhaust fan which, as shown in Fig. 2ª, may be a compressor 80 of the Rateau type driven by the engine.

Figure 6:
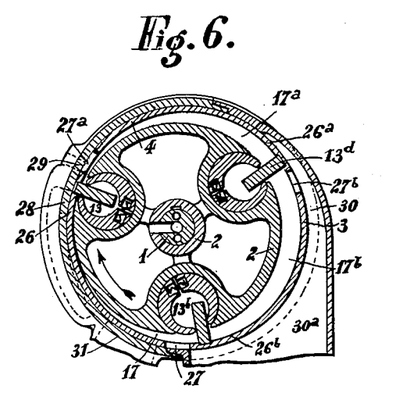

The vane 13 then reaches the position shown in Fig. 6, in which the port 26 is no longer opposite the port 31; furthermore the port 27 is no longer opposite the port 30 so that a certain volume of air is imprisoned in the chamber 17. As during the rotation this latter diminishes in volume, this air becomes compressed and when the port 27 reaches a position opposite the port 33, compressed air is admitted into the reserve chamber 32. The vane 13 again reaches the position shown in Fig. 1 and the port 26 comes opposite the port 28 and the air, previously compressed is admitted into the chamber $17_1$ as explained above.

The explanation given as regards chamber 17 obviously applies also to chambers 17ª, 17ᵇ. In this way three explosions take place per revolution. It is also obvious that any desired number of vanes 13 could be employed, thus giving a corresponding number of explosions or combustions per revolution.

The degree of compression of the air forced by the vanes 13 into the reserve chamber 32 can be controlled by a regulating device which determines the position at which for each chamber this compression begins, that is to say, the position in which the corresponding port 27 is no longer opposite the port 30. This device comprises a throttle or shoe 41 capable of movement between the stator 4 and the outer drum 3 in a groove 35ª (Fig. 1) which is formed in the stator and a corresponding ring 19 at the extremity of the port 30. The position of this shoe which causes the length of the port 30 to vary as regards the trajectory of the port 27, and consequently, the degree of compression of the air discharged into the reserve chamber 32, is controlled by the intermediary of a toothed wheel 36 located in a frame 37 and keyed upon a shaft 38 which can be rotated. A shoe 41 is obviously provided for each port 27 in cases where there are a plurality of exhaust ports 27 for each chamber 17.

For starting purposes an ignition device can be provided consisting for example of platinized wires 50 rendered incandescent by an electric current. These wires 50 are placed in position across the inlet ports 26. The current comes from a fixed ring 67 which is insulated from the stator, Fig. 9, through the intermediary of brushes 68 and insulated conductors 69 placed in recesses 70 in the vanes 13. The extremities of the platinized wires 50 are body-connected to the engine. The compressed air necessary for starting is introduced through a special nozzle 51.

Figure 10:
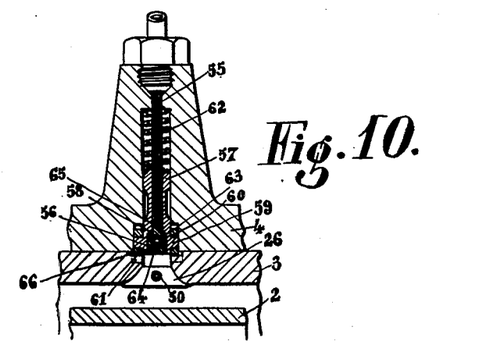
Fig. 10 is a section on line 10—10 of Fig. 1, along a radial plane passing through the axis of an injection pump.

In the case of liquid fuel the injection could be made by means of an injecting pump shown to a larger scale in Fig. 10. The fuel arrives under a low pressure through a fixed tube 55 which widens out near the outer drum 3 into a cylindrical portion 56 of greater diameter. A cylindrical piece 57 is forced upon the tube 55 and its shoulder 56 forms an annular chamber 58. The member 57 has two lateral axes 59 upon which are mounted rolls 60 which engage the negative cams 61 formed opposite the admission ports 26 upon the drum 3. A spring 62 under compression placed in a recess in the stator 4, exerts a pressure upon the member 57 and forces it to follow the profile of the cams 61 and of the drum 3. The fuel contained in the annular chamber 58 is forced each time the inlet ports 26 pass, through the perforation 63 of the members 56 through the narrow openings 64 into contact with the platinized wires 50 arranged across the ports 26.

After passing the cams 61, the chamber 58 resumes its original volume and uncovers the orifices 65 of the tube 55 through which a new charge of fuel is sucked in. Until the passage of the next inlet port 26, a spring-pressed ball valve 66 closes the perforations 63 and prevents any flow of fuel towards the openings 64.

In order to reduce to a minimum the clearance space caused by the outlet port 27 bosses 72 could be formed upon the inner drum 2 adapted to engage in the ports 27 as shown in Fig. 1.

The lubrication of the movable parts of the engine (Fig. 11) is ensured by means of the pump 73, which supplies oil under pressure to a series of conduits 74, in the stator 4, and communicating, through holes 75, with the surface of the drum 3, having the labyrinths 19. The oil under pressure fills the space comprised between the rotor and the stator, and thus increases the hermeticity of the engine. The return flow of oil to the pump takes place through collecting grooves 76, cut in the stator, at both ends thereof.

Figure 11:
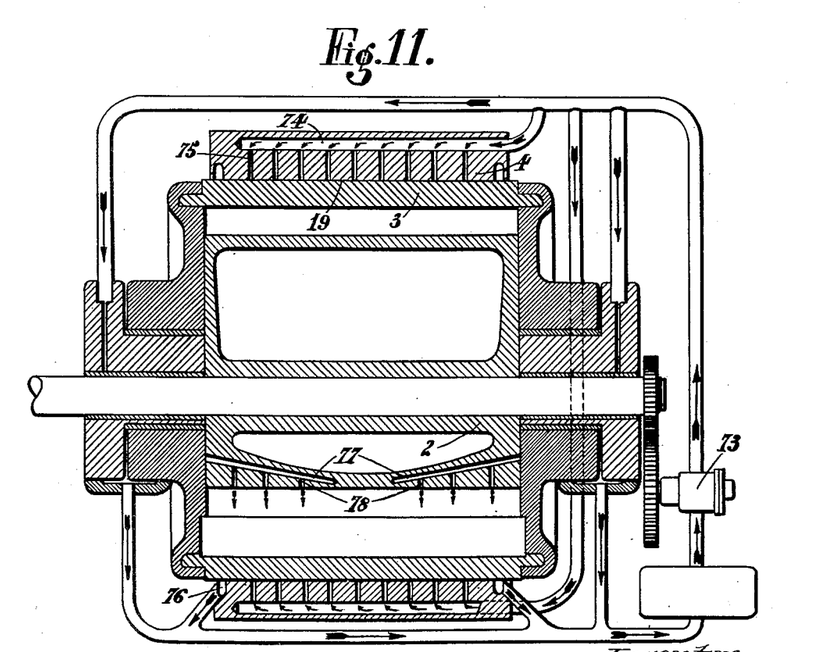
Fig. 11 is a diagrammatic section, showing the lubrication of the engine.

Part of the oil under pressure, which lubricates the bearings, is led, through conduits 77, of the inner drum 2, in holes 78 communicating with the pivotal joints of the two drums 2 and 3.

In accordance with the invention a plurality of rotary engines similar to that which has just been described could be keyed upon the same shaft 1 and this is shewn in Fig. 2ª. In this case the engines should be set at an angle relative to each other taking into account their eccentricity so that the explosions succeed each other in regular order.

If desired the engine according to the invention could be made to operate on the four stroke cycle system. In this case it would be sufficient to provide the fixed exhaust and inlet ports with automatic or positively driven valves, in such a manner that the movable inlet and exhaust valves of each chamber only come into communication with the said fixed ports once every two revolutions. In this case only one explosion would take place in each chamber for every two revolutions of the engine.

The circulating water is cooled in a radiator 52. It is circulated by a pump 53 actuated by the engine. In the same way the fuel is compressed by the pump 54.

In order to obtain a greater efficiency the exhaust gases are cooled immediately after they leave the exhaust port 30ª. With this end in view there is arranged in the port 30ª, which is provided with external cooling ribs, a coil in which passes the circulating water.

It is obvious that the invention has only been described by way of a purely explanatory example and in no way limitatively and that various modifications in detail could be made therein without departing from the spirit thereof.

Having now particularly described and ascertained the nature of my said invention and in what manner the same is to be performed, I declare that what I claim is:

1. A rotary engine, including a stator, a driven shaft, and a rotor, said rotor comprising a drum, a second drum mounted eccentrically thereof and keyed to said shaft, a plurality of vanes carried by and projecting internally of the first drum and dividing the eccentric space between the two drums into an equal number of chambers, said second drum having a plurality of substantially cylindrical longitudinal recesses in the periphery thereof, one to each vane, and a pair of jaw-forming hollow members mounted for oscillation in each recess and receiving the inner end of its respective vane.

2. A rotary engine, including a stator, a driven shaft, and a rotor, said rotor comprising a drum, a second drum mounted eccentrically thereof and keyed to said shaft, a plurality of vanes carried by and projecting internally of the first drum and dividing the eccentric space between the two drums into an equal number of chambers, said second drum having a plurality of substantially cylindrical longitudinal recesses in the periphery thereof, one to each vane, and a pair of jaw-forming hollow members mounted for oscillation in each recess and receiving the inner end of its respective vane, said first drum and stator being provided with ports for alinement at co-ordinated points to form in-take and exhaust ports for the chambers between the vanes.

3. A rotary engine, including a stator, a driven shaft, and a rotor, said rotor comprising a drum, a second drum mounted eccentrically thereof and keyed to said shaft, a plurality of vanes carried by and projecting internally of the first drum and dividing the eccentric space between the two drums into an equal number of chambers, said second drum having a plurality of substantially cylindrical longitudinal recesses in the periphery thereof, one to each vane, a longitudinally split cylinder mounted in each recess and provided adjacent the periphery of the rotor with a recess for receiving its respective vane, the inner faces of the same being separated, and a spring disposed between said inner faces to resiliently hold the outer edges in contact with the vane.

4. A rotary engine comprising, in combination, a stator including a bore, a driven shaft disposed within said stator bore eccentrically thereto, an outer drum rotating in said stator bore, an inner drum centered on said shaft and tangential to said outer drum, a plurality of vanes carried by and projecting internally of said outer drum and dividing the eccentric space between the two drums into a number of chambers of volumes varied by the eccentric rotary motion of said drums to allow the fuel to perform its working cycle, said inner drum including a plurality of recesses in the periphery thereof, one to each vane, and a pair of members mounted for oscillation in each recess to form a hollow jaw adapted to grip continuously the corresponding vane which projects therein whilst permitting displacement of said vane within the hollow of said jaw, said outer drum and stator being provided with ports for alinement at co-ordinated points to form in-take and exhaust ports for the chambers between the vanes.

5. A rotary engine comprising, in combination, a stator including a bore, a driven shaft disposed within said stator bore eccentrically thereto, an outer drum rotating in said stator bore, an inner drum centered on said shaft and tangential to said outer drum, a plurality of vanes sunk into and projecting internally of said outer drum and dividing the eccentric space between the two drums into a number of chambers of volumes varied by the eccentric rotary motion of said drums to permit the fuel to perform its working cycle, said inner drum including a plurality of recesses in the periphery thereof in which said vanes can penetrate respectively, a pair of members mounted for oscillation in each recess to form a hollow jaw, and springs inserted between said members whereby the same can grip resiliently the corresponding vane which projects therein whilst permitting displacement of said vane within the hollow of said jaw, said outer drum being provided with two sets of ports, one set for the air and fuel in-take and the other for the exhaust, said ports respectively coming into alinement at co-ordinated points with corresponding fixed ports provided in said stator.

6. A rotary engine comprising, in combination, a stator including a bore, a driven shaft disposed within said stator bore eccentrically thereto, an outer drum rotating in said stator bore, an inner drum centered on said shaft and tangential to said outer drum, a plurality of vanes carried by and projecting internally of said outer drum and dividing the eccentric space between the two drums into a number of chambers of volumes varied by the eccentric rotary motion of said drums to allow the fuel to perform its working cycle, said inner drum including a plurality of recesses in the periphery thereof, one to each vane, and a pair of members mounted for oscillation in each recess to form a hollow jaw adapted to grip continuously the corresponding vane which projects therein whilst permitting displacement of said vane within the hollow of said jaw, said stator being provided with an air reserve chamber, into which air compressed by one of said chambers is delivered therefrom through a port in said outer drum, said air reserve chamber having an outlet port located after the tangent line between said drums for supplying compressed air to the same outer drum port after having received the charge through said port.

7. A rotary engine, comprising, in combination, a stator including a bore, a driven shaft disposed within said stator bore eccentrically thereto, an outer drum rotating in said stator bore, an inner drum centered on said shaft and tangential to said outer drum, a plurality of vanes carried by and projecting internally of said outer drum and dividing the eccentric space between the two drums into a number of chambers of volumes varied by the eccentric rotary motion of said drums to allow the fuel to perform its working cycle, said inner drum including a plurality of recesses in the periphery thereof, one to each vane, and a pair of members mounted for oscillation in each recess to form a hollow jaw adapted to grip continuously the corresponding vane which projects therein whilst permitting displacement of said vane within the hollow of said jaw, said stator being provided with an air reserve chamber, into which air, compressed by one of said chambers, is delivered therefrom through an exhaust port in said outer drum, said air reserve chamber having an outlet port located after the tangent line between said drums for delivering compressed air to one of said chambers through an inlet port in said outer drum, said stator having a fuel inlet port for admitting fuel through the inlet port of the outer drum into its respective chamber, additional ports being provided in said outer drum respectively adapted to come into register with corresponding fixed ports in said stator for admission of scavenge air and for exhausting the products of combustion.

8. A rotary engine comprising, in combination, a stator including a bore, a driven shaft disposed within said stator bore eccentrically thereto, an outer drum rotating in said stator bore, an inner drum centered on said shaft, a plurality of vanes encased in and projecting internally of said outer drum and dividing the eccentric space between the two drums into a number of chambers of volumes varied by the eccentric rotary motion of said drums to allow the fuel to perform its working cycle, said inner drum including a plurality of recesses in the periphery into which said vanes respectively penetrate, a sleeve adapted to oscillate in each recess, and a pair of jaw-forming hollow members mounted for oscillation in each of said sleeves and receiving the inner end of the corresponding vane.

JEAN EDOUARD TUSCHER.